(12) United States Patent
Higashikawa (10) Patent No.: US 11,161,997 B2
(45) Date of Patent: *Nov. 2, 2021

(54) DECORATIVE MATERIAL

(71) Applicant: TOPPAN PRINTING CO., LTD., Tokyo (JP)

(72) Inventor: Eiichi Higashikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 116 days.

This patent is subject to a terminal disclaimer.

(21) Appl. No.: 16/688,903

(22) Filed: Nov. 19, 2019

(65) Prior Publication Data

US 2020/0087529 A1   Mar. 19, 2020

Related U.S. Application Data

(63) Continuation of application No. PCT/JP2018/026012, filed on Jul. 10, 2018.

(30) Foreign Application Priority Data

Jul. 11, 2017   (JP) .............................. JP2017-135734

(51) Int. Cl.
*B32B 3/00*   (2006.01)
*C09D 11/54*   (2014.01)
(Continued)

(52) U.S. Cl.
CPC ................ *C09D 11/54* (2013.01); *B32B 3/00* (2013.01); *C09D 11/037* (2013.01);
(Continued)

(58) Field of Classification Search
CPC .. B32B 3/00; C09D 11/101; Y10T 428/24802
See application file for complete search history.

(56) References Cited

U.S. PATENT DOCUMENTS

2017/0218220 A1   8/2017   Jingu et al.

FOREIGN PATENT DOCUMENTS

| CN | 106661376 A | 5/2017 |
| JP | 2000-043223 A | 2/2000 |

(Continued)

OTHER PUBLICATIONS

International Searchring Authority, "International Search Report," issued in in connection with International Patent Application No. PCT/JP2018/026012, dated Oct. 2, 2018.

(Continued)

*Primary Examiner* — Elizabeth E Mulvaney
(74) *Attorney, Agent, or Firm* — Foley & Lardner LLP (57) ABSTRACT

A decorative material with improved release properties and scratch resistance. A decorative material according to a mode of the present invention includes a first gloss control layer provided to a front surface and a second gloss control layer provided on part of the first gloss control layer. The first gloss control layer contains a gloss control agent comprised of a hydrophilic inorganic material and a silicone-based release agent having a reactive terminal group. The reactive terminal group of the silicone-based release agent preferably has at least one of a hydroxyl group and an amino group. The second gloss control layer contains a silicone-based release agent having a reactive terminal group, and the reactive terminal group of the silicone-based release agent has at least one of an acryloyl group and a methacryloyl group.

12 Claims, 1 Drawing Sheet

(51) Int. Cl.
　　　*C09D 11/037*　　(2014.01)
　　　*C09D 11/101*　　(2014.01)
　　　*C09D 11/102*　　(2014.01)

(52) U.S. Cl.
　　　CPC .......... *C09D 11/101* (2013.01); *C09D 11/102* (2013.01); *Y10T 428/24802* (2015.01)

(56) References Cited

FOREIGN PATENT DOCUMENTS

| JP | 2001-341273 | A  | 12/2001 |
| JP | 2004-090319 | A  | 3/2004  |
| JP | 3629964     | B2 | 3/2005  |
| JP | 2014-188842 | A  | 10/2014 |
| JP | 2016-093968 | A  | 5/2016  |
| JP | 2016-165870 | A  | 9/2016  |
| WO | WO-2018/117260 | A1 | 6/2018 |

OTHER PUBLICATIONS

International Searching Authority, "Written Opinion," issued in connection with International Patent Application No. PCT/JP2018/026012, dated Oct. 2, 2018.

DECORATIVE MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/026012, filed on Jul. 10, 2018, which is based upon and claims the benefit of priority to Japanese Patent Application No. 2017-135734, filed on Jul. 11, 2017; the disclosures of which are all incorporated herein by reference in their entireties.

BACKGROUND

Technical Field

The present invention relates to a decorative material.

Background Art

A technique related to a decorative material is described, for example, in PTL 1.

CITATION LIST

[Patent Literature] PTL 1: JP 3629964 B

Technical Problem

As decorative materials based on conventional art, there is known a decorative material in which gloss control layers are laminated. The gloss control layers are synthetic coating material layers each forming asperities having a continuously changing depth to express unevenness. However, few decorative materials can satisfy high scratch resistance and long-lasting stable release properties, with visual effects being imparted by lamination of an upper gloss control layer on part of a lower gloss control layer.

The present invention aims to provide a decorative material having improved or even high scratch resistance and long-lasting stable release properties, with visual effects being imparted by lamination of an upper gloss control layer on part of a lower gloss control layer.

SUMMARY OF THE INVENTION

Solution to Problem

Applying dual curing to the resin compositions of gloss control layers by combining an ionizing radiation-curable resin with a urethane-based resin, the inventor of the present invention has conducted extensive research and experimentation for optimizing, i.e., suitably combining, a gloss control agent and a reactive terminal group of a silicone-based release agent to be added to each gloss control layer. This research and experimentation has brought about a decorative material having improved or even high scratch resistance and exhibiting long-lasting stable release properties.

To address the problem, a decorative material according to an aspect of the present invention includes a first gloss control layer provided to a front surface and a second gloss control layer provided on part of the first gloss control layer. In the decorative material, the first gloss control layer contains a gloss control agent comprised of a hydrophilic inorganic material and a silicone-based release agent having a reactive terminal group.

The hydrophilic inorganic material herein refers to an inorganic material having hydrophilic surfaces. A typical hydrophilic inorganic material may be silica or the like which is not surface-treated or surface-modified, i.e., which is not subjected to hydrophilization treatment of the surfaces.

Advantageous Effects of the Invention

According to an aspect of the present invention, a decorative material having improved or even long-lasting stable release properties can be provided by selecting a gloss control agent to be added to a first gloss control layer that is a lower gloss control layer serving as a base and using a silicone-based release agent having a reactive terminal group. Specifically, the present invention aims to provide a decorative material having improved or even high scratch resistance and exhibiting long-lasting stable release properties, while imparting visual effects by lamination of an upper gloss control layer on part of a lower gloss control layer.

DETAILED DESCRIPTION

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

(Configuration)

Figure 1:
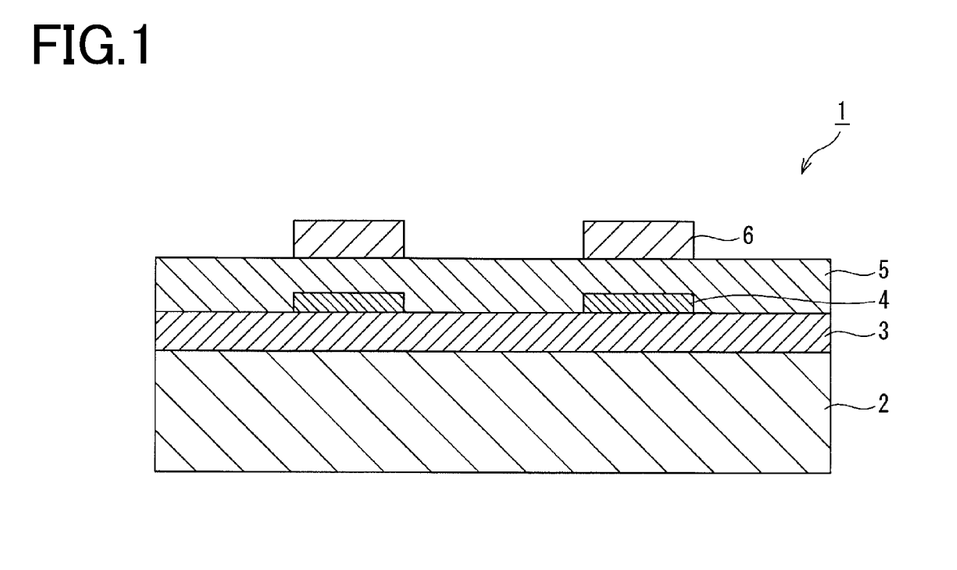
FIG. 1 is a cross-sectional view illustrating a configuration of a decorative material according to an embodiment of the present invention.

A decorative material 1 according to the present embodiment includes gloss control layers provided to the front surface. As shown in FIG. 1, the gloss control layers include a lower first gloss control layer 5 as a base, and a second gloss control layer 6 which is provided on part of the first gloss control layer 5 to improve visual effects.

The decorative material 1 may be configured to include other known layers, such as a base solid ink layer 3, a patterned ink layer 4 and a transparent resin layer (not shown), between a base material 2 and the first gloss control layer 5.

<Gloss Control Layers>

The first gloss control layer 5 is provided on the base solid ink layer 3 and the patterned ink layer 4 to control glossiness of the surface of the decorative material 1. The first gloss control layer 5 is formed on the entire front surface (upper surface in FIG. 1) of the base solid ink layer 3 and the patterned ink layer 4, and covers the entire front surface of the base material 2. The second gloss control layer 6, which has a gloss different from that of the first gloss control layer 5, is provided on the first gloss control layer 5 to control glossiness of the surface of the decorative material 1. The second gloss control layer 6 is formed on part of a surface of the first gloss control layer 5. The difference in glossiness between the first and second gloss control layers 5 and 6 contributes to expressing an uneven configuration and improving visual effects.

The first and second gloss control layers 5 and 6 may each preferably have a thickness of 1 μm or more and 15 μm or less. The first and second gloss control layers 5 and 6, which serve as an outermost surface of the decorative material 1, are required to have surface physical properties, such as abrasion resistance, scratch resistance and solvent resistance, as a decorative material 1. Of these properties, abrasion resistance and scratch resistance are affected by the layer thickness. A thicker layer is more advantageous. Therefore, the first and second gloss control layers 5 and 6 may each more preferably have a thickness of 2 μm or more and 12 μm or less. If the thickness is less than 1 μm, abrasion resistance and scratch resistance may be significantly deteriorated, and usage as a decorative material 1 may be limited. If the thickness is more than 15 μm, flexibility of the first and second gloss control layers 5 and 6 may be deteriorated, and processability as a decorative material 1 may be deteriorated.

The first and second gloss control layers 5 and 6 each contain at least a resin material, and a gloss control agent and a release agent added to the resin material. It should be noted that the gloss control agent may be added only to the first gloss control layer 5 having relatively low glossiness.

(Resin Component)

The resin materials respectively forming the first and second gloss control layers 5 and 6 may preferably have transparency to enable observation of a lower layer.

The transparent resin used for the first gloss control layer 5 may preferably contain a main material that is a mixture of a two-part urethane-based thermosetting resin comprising at least one polyol and at least one isocyanate with an ionizing radiation-curable resin having an acryloyl group or a methacryloyl group. In this case, the content of the urethane-based thermosetting resin is preferably 3 parts by mass or more and 100 parts by mass or less, and more preferably 10 parts by mass or more and 50 parts by mass or less relative to 100 parts by mass of the ionizing radiation-curable resin. In such a configuration, the ionizing radiation-curable resin forming the resin component can be cured by applying an ionizing radiation to a decorative material 1 as produced, so that the first gloss control layer 5 will have improved scratch resistance. Furthermore, due to the content of the urethane-based thermosetting resin being 10 parts by mass or more and 50 parts by mass or less relative to 100 parts by mass of the ionizing radiation-curable resin, elimination of defects at the time of laminating the second gloss control layer 6 and scratch resistance of the first gloss control layer 5 can both be maintained at a high level.

If the content of the urethane-based thermosetting resin is less than 3 parts by mass, there may occur a defect of dissolving or scraping the first gloss control layer 5 when the second gloss control layer 6 is laminated thereon. If the content of the urethane-based thermosetting resin exceeds 100 parts by mass, the crosslinking degree of the resin composition may be lowered, and scratch resistance of the first gloss control layer 5 may be significantly deteriorated.

Thus, the decorative material 1 of the present embodiment can exhibit high scratch resistance, while minimizing defects that would be caused during lamination.

The main material in the present specification refers to a resin material of which the content is 90 parts by mass or more or preferably 97 parts by mass or more relative to 100 parts by mass of the entire resin component included in the target layer.

The main material of the resin component included in the second gloss control layer 6 is preferably a mixture of a urethane-based thermosetting resin comprising a polyol and an isocyanate with an ionizing radiation-curable resin having an acryloyl group or a methacryloyl group. In this case, the content of the urethane-based thermosetting resin is preferably 25 parts by mass or less relative to 100 parts by mass of the ionizing radiation-curable resin.

If the addition ratio of the urethane-based thermosetting resin exceeds 25 parts by mass, the ratio of the urethane-based thermosetting resin may be excessively high. Therefore, the degree of crosslinking of the resin composition may be lowered, and scratch resistance of the second gloss control layer 6 may be significantly deteriorated. If the addition ratio of the urethane-based thermosetting resin is less than 3 parts by mass, the required characteristics of the decorative material 1 may not be necessarily satisfied, when processability (prevention of cracking) is required of the decorative material 1. When the content of the urethane-based thermosetting resin in the second gloss control layer 6 is 25 parts by mass or less in a decorative material 1 as produced and this decorative material 1 is irradiated with ionizing radiation, the ionizing radiation-curable resin included in the resin component can be sufficiently cured, and scratch resistance of the second gloss control layer 6 can be improved.

The main material of the resin component included in the second gloss control layer 6 may be an ionizing radiation-curable resin having an acryloyl group or a methacryloyl group. In this case, the resin component included in the second gloss control layer 6 is preferably only an ionizing radiation-curable resin having an acryloyl group or a methacryloyl group.

The ionizing radiation-curable resin having an acryloyl group or a methacryloyl group may be a known resin, including, for example, various monomers and commercially available oligomers. For example, the ionizing radiation-curable resin having an acryloyl group or a methacryloyl group of the present embodiment may preferably be from polyfunctional monomers such as pentaerythritol triacrylate (PET3A), pentaerythritol tetraacrylate (PET4A), trimethylolpropane triacrylate (TMPTA) and dipentaerythritol hexaacrylate (DPHA), polyfunctional oligomers such as Shikoh UV-1700B (manufactured by Nippon Synthetic Chemical Industry Co., Ltd. (currently Mitsubishi Chemical Corporation)), or mixtures thereof.

For example, the isocyanate of the urethane-based thermosetting resin having a polyol and an isocyanate may be curing agents, such as adducts, biurets and isocyanurates, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate methylhexane diisocyanate (HTDI), bis(isocyanatemethyl)cyclohexane (HXDI), trimethylhexamethylene diisocyanate (TMDI), or the like. For example, the polyol may be an acrylic polyol, polycarbonate polyol, polyester polyol, or the like.

As the ionizing radiation-curable resin having an acryloyl group or a methacryloyl group forming the first and second gloss control layers 5 and 6, a polyfunctional (meth)acrylate monomer or oligomer having a number average molecular weight of 300 or more and 5,000 or less, and a functional group number or average functional group number of 4 or more and 15 or less may be preferably used. Within this range, the degree of crosslinking of the resin component in the gloss control layers can be sufficiently increased. Thus, high scratch resistance can be exhibited. It is more preferable to use a polyfunctional (meth)acrylate monomer having a number average molecular weight of 300 or more and 1,500 or less, and a functional group number or average functional group number of 4 or more and 8 or less. Within this range, the viscosity of the ionizing radiation-curable resin can be lowered. Thus, when an ink for forming a gloss control layer is prepared, the solids concentration can be increased at this low viscosity, so that the stability or coating state of the ink can be improved. Examples of the polyfunctional (meth)acrylate monomer include pentaerythritol tetra(meth)acrylate (PET4A) and modifications thereof, ditrimethylolpropane tetra(meth)acrylate and modifications thereof, dipentaerythritol penta(meth)acrylate (DPPA) and modifications thereof, and dipentaerythritol hexa(meth)acrylate (DPHA) and modifications thereof.

The method of measuring the number average molecular weight of the ionizing radiation-curable resin is not particularly limited. However, for example, gel permeation chromatography may be preferably used. Measuring devices based on the GPC are not particularly limited. However, for example, the filler of the GPC column is preferably a polystyrene gel, and tetrahydrofuran (THF) is preferably used as an eluent. For example, a polystyrene polymer may be used as a standard substance for GPC. Since the above polyfunctional (meth)acrylate monomer is structured as a single substance, if the structure of the monomer is known, the number average molecular weight may be a value calculated from the structural formula.

[Gloss Control Agent]

In the present embodiment, fine particles of an inorganic material having hydrophilic surfaces (hydrophilic inorganic material) are used as a gloss control agent to be added to at least to the first gloss control layer 5.

For example, the hydrophilic inorganic material may be a known inorganic material which is not surface-treated or surface-modified, i.e., which is not subjected to hydrophobization treatment of the surfaces. As a gloss control agent that can constitute such a hydrophilic inorganic material, for example, fine particles of inorganic materials, such as silica, glass, alumina, calcium carbonate or barium sulfate, are suitable. Inorganic materials which are not surface-treated or surface-modified have hydrophilic surfaces with many hydroxyl groups remaining thereon. A silicone-based release agent to be added is hydrophobic. Therefore, the silicone-based release agent is not adsorbed by the surfaces of the inorganic material, rather, it is repelled by the surfaces. Accordingly, the silicone-based release agent has a higher tendency of being unevenly distributed on the surface of the gloss control layer. Consequently, sufficient release properties can be exhibited using a smaller amount of silicone-based release agent.

The hydrophilic inorganic material may be silica having hydrophilic surfaces even if it is surface-treated or surface-modified to some extent. For example, the hydrophilic inorganic material of the present embodiment is preferably a material that satisfies (Value of Evaluation method B/Value of Evaluation method A)<1.2 in the following two Evaluation methods A and B.

Evaluation Method A (Heat Loss Evaluation)

A gloss control agent is heated to 110° C. and a mass decrease is measured. Primarily, water adsorbed by the surfaces of the gloss control agent is desorbed and a mass decrease occurs accordingly. Even when the inorganic material has been surface-treated, the component is not desorbed or volatilized at 110° C. Therefore, if the material for the gloss control agent is the same, there is no numerical difference depending on whether the material has been surface-treated or not, and the value remains unchanged. However, since the amount of adsorption of water depends on the method of producing the gloss control agent, this value varies between gloss control agents.

The specific method of measurement is based on JIS K5101,23. Specifically, the gloss control agent is left standing under a 110° C. environment for a sufficiently long time (e.g., 2 hours) and then a mass decrease is measured.

Evaluation Method B (Ignition Loss Evaluation)

A gloss control agent is heated to 950° C. and a mass decrease is measured. Organic materials treated on (adhered to) the surfaces of the gloss control agent are desorbed from the gloss control agent by heating up to 950° C. Accordingly, if the temperature is maintained at 950° C., the mass decrease of a surface-treated gloss control agent is larger than that of the gloss control agent that has not been surface-treated. This difference indicates a surface treatment amount.

The specific method of measurement is based on JIS K5101,23. Specifically, the gloss control agent is left standing under a 950° C. environment for a sufficiently long time (e.g., 2 hours) and then a mass decrease is measured.

An inorganic material satisfying the (Value of Evaluation method B/Value of Evaluation method A)<1.2, even if it has been surface-treated or surface-modified more or less, is assumed to have hydrophilicity equivalent to that of the inorganic material that has not been surface-treated or surface-modified, and to have hydrophilic surfaces with many hydroxyl groups remaining thereon.

If a gloss control agent is added to the second gloss control layer 6 as well, the gloss control agent may also preferably be a hydrophilic inorganic material. However, a commercially available known gloss control agent or the like may be used. For example, fine particles of an inorganic material, such as silica, glass, alumina, calcium carbonate or barium sulfate, may be used as in the gloss control agent added to the first gloss control layer 5. Alternatively, fine particles of an organic material comprised of an acrylic material or the like may be used. However, if high transparency is required, fine particles such as of silica, glass or an acrylic material may preferably be used. In particular, among fine particles of silica, glass or the like, a gloss control agent with a low bulk density, in which fine primary particles, rather than solid spherical particles, undergo secondary aggregation, has a higher matting effect relative to the additive amount. Thus, use of such a gloss control agent contributes to forming a gloss control layer having lower glossiness. Consequently, the difference in glossiness between the first and second gloss control layers 5 and 6 can be increased, and a sufficiently textured appearance can be obtained. Thus, high-quality design expression having an appearance of greater depth can be achieved.

The gloss control agent may have an arbitrarily selected particle size. Preferably, the particle size is 2 μm or more and 15 μm or less. More preferably, the particle size is 4 μm or more and 12 μm or less. If the particle size of the gloss control agent is less than 2 μm, the matting effect may be poor and the textured appearance due to the difference in glossiness is not necessarily sufficiently obtained. If the particle size of the gloss control agent is larger than 15 μm, light scattering may be strong. This may cause cloudiness in the first gloss control layer 5 or the second gloss control layer 6, whichever may contain the gloss control agent, or increase visibility of particles. Thus, the textured appearance due to the difference in glossiness may be impaired.

[Release Agent]

Since the decorative material 1 of the present embodiment is required to have long-lasting stable release properties, it is important to add a silicone-based release agent having a reactive terminal group to the first gloss control layer 5. It should be noted that silicone-based release agents are also used as lubricants.

In particular, it is preferable to add a silicone-based release agent having either or both of a hydroxyl group and an amino group as a reactive terminal group. In this case, for the structure of the silicone skeleton, a reactive terminal group may be appropriately selected in terms of miscibility or the like when used as a coating agent by being mixed with a resin and a solvent. The structure is not particularly limited. Since a urethane-based thermosetting resin is used as a resin forming the first gloss control layer 5, the hydroxyl group or the amino group is incorporated into the resin skeleton during the urethane curing reaction. Thus, long-lasting stable release properties can be exhibited.

The additive amount of the silicone-based release agent having a hydroxyl group or an amino group is preferably 1 part by mass or more and 6 parts by mass or less as an active component of the silicone-based release agent relative to 100 parts by mass of the entire solids included in the first gloss control layer 5. If the additive amount is less than 1 part by mass, it may be difficult to exhibit the required release properties, and if it exceeds 6 parts by mass, a part of the silicone-based release agent may not be incorporated into the resin skeleton, and long-lasting release properties are not necessarily stably obtained.

The release agent to be added to the second gloss control layer 6 may also preferably be a silicone-based release agent having a reactive terminal group. It is important that the silicone-based release agent has either or both of an acryloyl group and a methacryloyl group as a reactive terminal group. As in the first gloss control layer 5, the type of the silicone skeleton is not particularly limited. The additive amount of the silicone-based release agent having either or both of an acryloyl group and a methacryloyl group is preferably 0.5 parts by mass or more and 5 parts by mass or less as an active component of the silicone-based release agent relative to 100 parts by mass of the entire solids included in the second gloss control layer 6. If the additive amount is less than 0.5 parts by mass, it may be difficult to exhibit the required release properties, and if it exceeds 5 parts by mass, a part of the silicone-based release agent may not be incorporated into the resin skeleton, and long-lasting release properties are not necessarily stably exhibited.

The additive amount of the gloss control agent is preferably 5 parts by mass or more and 40 parts by mass or less relative to 100 parts by mass of the resin composition. More preferably, the additive amount of the gloss control agent is 10 parts by mass or more and 30 parts by mass or less. If the additive amount is less than 5 parts by mass, the matting effect may be insufficient. Thus, the difference in glossiness from the gloss control layer having relatively higher glossiness may be smaller and the textured appearance may be insufficient. If the additive amount is more than 40 parts by mass, the amount of the resin composition may be relatively insufficient for the amount of the gloss control agent. Therefore, the gloss control agent may be desorbed, or scratch resistance may be deteriorated due to the desorption, so that durability required of the decorative material 1 may be greatly impaired.

It should be noted that a gloss control agent may also be arbitrarily added to a gloss control layer having relatively high glossiness. These additive amounts should be appropriately controlled depending on the final textured appearance or visual effects to be achieved. The gloss control agent and the resin composition may be the same or may be different between the first and second gloss control layers 5 and 6. They may be selected as desired according to the required textured appearance and other required properties.

[Other Additives]

For the impartment of various functions, the first and second gloss control layers 5 and 6 may contain functional additives, such as an antimicrobial agent and an antifungal agent. As necessary, an ultraviolet absorber or a light stabilizer may be added to the layers. For example, the ultraviolet absorber may be a benzotriazole-, benzoate-, benzophenone-, triazine- or cyanoacrylate-based ultraviolet absorber. For example, the light stabilizer may be a hindered amine-based light stabilizer.

<Base Material>

The base material 2 is not particularly limited, as long as it is usable as base paper for the decorative material 1. Known materials can be used for the base material 2. For example, materials that can be used include paper, such as tissue paper, resin-mixed paper, titanium paper, resin-impregnated paper, flame-resistant paper, and inorganic paper; woven or non-woven fabrics made of natural fibers or synthetic fibers; synthetic resin-based base materials comprising homo or random polypropylene resins, polyolefin resins such as polyethylene resin, copolymerized polyester resins, amorphous-state crystalline polyester resins, polyethylene naphthalate resins, polybutylene resins, acrylic resins, polyamide resins, polycarbonate resins, polyvinyl chloride resins, polyvinylidene chloride resins and fluororesins; wooden base materials, such as wood veneers, sliced veneers, plywood, laminate wood, particle boards and medium density fiberboards; inorganic base materials, such as gypsum plates, cement plates, calcium silicate plates and pottery plates; metal-based base materials, such as iron, copper, aluminum and stainless steel; and composite materials and laminates thereof. For example, the base material 2 may have a shape of a film, a sheet, a plate, a modified molded body, or the like.

<Patterned Ink Layer>

A patterned ink layer 4 for imparting a design pattern to the decorative material 1 may be formed between the base material 2 and the first gloss control layers 5. The design pattern may be, for example, of wood grain, stone, sand, tile, brick, fabric, grained leather, geometric figure, or the like. In the example of FIG. 1, the patterned ink layer 4 is formed right beneath the second gloss control layer 6. In other words, the second gloss control layer 6 is formed only in a portion overlapping the patterned ink layer 4. The design pattern of the patterned ink layer 4 matches with the glossiness of the second gloss control layer 6. Thus, the visual effects of the second gloss control layer 6 can be imparted to the visual effects of the patterned ink layer 4. Thus, a decorative material 1 that expresses a design having an air of luxury close to that of natural wood or natural stone can be formed. The expression "match with" refers to at least part of the second gloss control layer 6 being overlapped with the patterned ink layer 4 in plan view. If 50% or more of the area of forming the second gloss control layer 6 overlaps with the patterned ink layer 4 in plan view, both layers may be visually recognized as highly matching with each other.

The present embodiment shows an example in which the second gloss control layer 6 is formed only in a portion overlapping the patterned ink layer 4, i.e., formed only right above the patterned ink layer 4. However, other configurations may also be used. For example, as long as the second gloss control layer 6 is formed in a portion overlapping the patterned ink layer 4 in plan view (as seen perpendicularly to the front surface), the second gloss control layer 6 may be formed in a portion other than the portion right above the patterned ink layer 4.

<Base Solid Ink Layer>

According to the intended design, a base solid ink layer 3 may be provided between the base material 2 and the patterned ink layer 4. The base solid ink layer 3 is provided covering the entire first gloss control layer 5-side surface of the base material 2. As necessary, the base solid ink layer 3 may be a multilayer having two or more layers, considering masking or the like. Patterned ink layers 4 may be laminated by a number corresponding to the necessary number of separate plates so that the required design can be expressed. Thus, the patterned ink layer 4 and the base ink layer 3 can be combined in various ways according to the required design, i.e., the design required to be expressed. However, the combinations are not particularly limited.

The material forming the base ink layer 3 or the patterned ink layer 4 is not particularly limited. For example, the material may be a printing ink or a coating agent in which a matrix and a coloring agent, such as a dye or a pigment, are dissolved and dispersed in a solvent. For example, the matrix may be various synthetic resins, such as an oily nitrocellulose resin, two-part urethane resin, acrylic resin, styrene-based resin, polyester-based resin, urethane-based resin, polyvinyl-based resin, alkyd resin, epoxy-based resin, melamine-based resin, fluororesin, silicone-based resin and rubber-based resin; mixtures or copolymers thereof, or the like. Examples of the coloring agent include inorganic pigments, such as carbon black, titanium white, zinc white, rouge, chrome yellow, Prussian blue and cadmium red; organic pigments, such as azo pigments, lake pigments, anthraquinone pigments, phthalocyanine pigments, isoindolinone pigments and dioxazine pigments; and mixtures thereof. As the solvent, toluene, xylene, ethyl acetate, butyl acetate, methyl alcohol, ethyl alcohol, isopropyl alcohol, acetone, methyl ethyl ketone, methyl isobutyl ketone, cyclohexanone, water or a mixture thereof may be used.

To impart various functions to the base solid ink layer 3 and the patterned ink layer 4, functional additives may be added to these layers. Examples of the functional additives include extender pigments, plasticizers, dispersants, surfactants, tackifiers, adhesive aids, drying agents, curing agents, curing accelerators and curing retarders.

The base solid ink layer 3, the patterned ink layer 4, and the first and second gloss control layers 5 and 6 may each be formed by various printing methods, such as gravure printing, offset printing, screen printing, electrostatic printing and ink-jet printing. The base solid ink layer 3 and the first gloss control layer 5, which cover the entire front surface of the base material 2, can also be formed by various coating methods, such as roll coating, knife coating, microgravure coating and die coating. A method may be selected from these printing and coating methods for each layer to be formed, or the same method may be selected for all the layers to carry out collective processing.

To control the thickness of the first and second gloss control layers 5 and 6, the application amount may be controlled when performing the above printing method or coating method. In each printing method or coating method, the application amount can be obtained by calculating a mass difference between decorative materials which are produced with a gloss control layer either being formed or not formed on the base material 2.

<Transparent Resin Layer>

In particular, when abrasion resistance is required, a transparent resin layer (not shown) may be provided between the patterned ink layer 4 and the first gloss control layer 5. For example, a resin composition comprising an olefin-based resin as a main component may be preferably used as the transparent resin layer. Examples of the olefin-based resin include polypropylene, polyethylene and polybutene; as well as those obtained by homopolymerization or copolymerization of two or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene); and those obtained by copolymerization of ethylene or α-olefins with other monomers, such as an ethylene-vinyl acetate copolymer, an ethylene-vinyl alcohol copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer and an ethylene-butyl acrylate copolymer. In particular, if surface strength is to be improved even more, highly crystalline polypropylene, for example, may be preferably used.

For example, the transparent resin layer may contain additives, such as a heat stabilizer, an ultraviolet absorber, a light stabilizer, an antiblocking agent, a catalyst scavenger and a coloring agent. These additives may be suitably selected from known additives. The transparent resin layer can be formed, for example, by various lamination methods, such as a method using thermal pressure, an extrusion lamination method and a dry lamination method.

(Advantageous Effects and Others)

(1) The decorative material 1 of the present embodiment includes a first gloss control layer 5, and a second gloss control layer 6 provided on part of the first gloss control layer 5. This configuration contributes to providing good visual effects.

In the decorative material 1 of the present embodiment, the design pattern of the patterned ink layer 4 matches with the glossiness of the second gloss control layer 6. Therefore, the visual effects of the second gloss control layer 6 can be imparted to the visual effects of the patterned ink layer 4, so that a decorative material 1 that expresses a design with an air of luxury close to that of natural wood or natural stone can be formed.

(2) In the decorative material 1 of the present embodiment, the base-side first gloss control layer 5 contains a gloss control agent comprised of a hydrophilic inorganic material, and a silicone-based release agent having a reactive terminal group.

In this case, the reactive terminal group of the silicone-based release agent may preferably have at least one of a hydroxyl group and an amino group.

With this configuration of using a hydrophilic gloss control agent and a hydrophobic silicone-based release agent, the silicone-based release agent has a higher tendency of being unevenly distributed on the surface of the gloss control layer. Consequently, sufficient release properties can be exhibited using a smaller amount of silicone-based release agent. Furthermore, use of an inorganic material, such as silica, as a gloss control agent can exhibit high transparency which can enhance visibility of the lower layer.

Consequently, there can be provided a decorative material 1 having improved or even high visibility for the lower layer and improved or even long-lasting stable release properties.

(3) The decorative material 1 of the present embodiment uses a gloss control agent which is comprised of an inorganic material having a high matting effect. Therefore, the glossiness of the gloss control layer to which the gloss control agent has been added can be greatly lowered. Accordingly, the difference in glossiness between the first and second gloss control layers 5 and 6 can be increased, and a sufficiently textured appearance can be obtained. Thus, high-quality design expression having an appearance of greater depth can be achieved.

(4) In the decorative material 1 of the present embodiment, the resin component included in the first gloss control layer 5 is a mixture of a two-part urethane-based thermosetting resin containing at least one polyol and at least one isocyanate with an ionizing radiation-curable resin having an acryloyl group or a methacryloyl group. The mixing ratio, in this case, of the thermosetting resin is 3 parts by mass or more and 100 parts by mass or less relative to 100 parts by mass of the ionizing radiation-curable resin.

With this configuration, since the first gloss control layer 5 is a dually cured layer obtained through thermal curing and ionizing radiation curing, no defects are caused when laminating the second gloss control layer 6. Thus, a decorative layer 1 having high scratch resistance can be provided.

(Modifications)

(1) As shown in FIG. 1, the present embodiment shows an example in which the second gloss control layer 6 is formed in a portion overlapping the patterned ink layer 4, and the design pattern of the patterned ink layer 4 matches with the glossiness of the second gloss control layer 6. However, other configurations may also be used.

Figure 2:
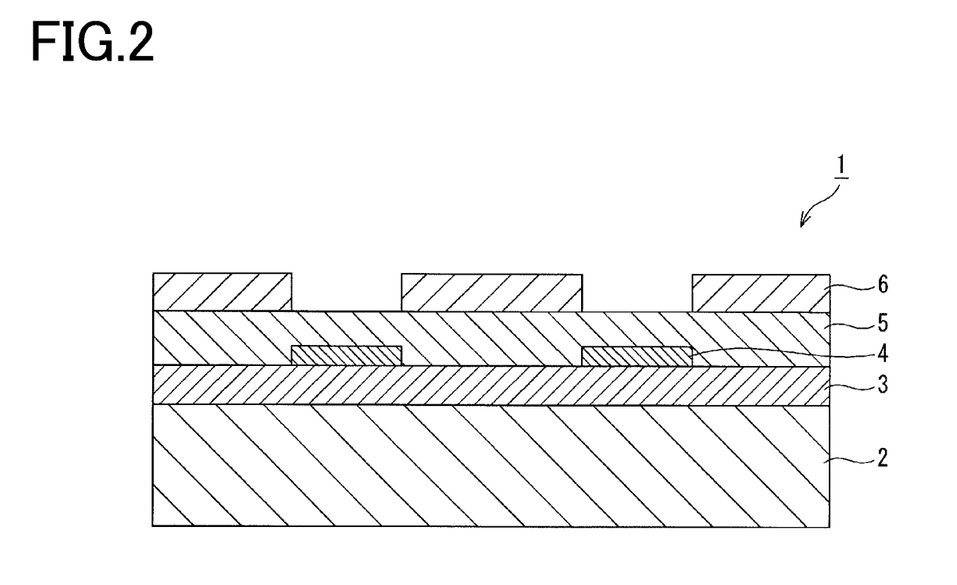
FIG. 2 is a cross-sectional view illustrating a configuration of a decorative material according to a modification of an embodiment of the present invention.

For example, as shown in FIG. 2, the second gloss control layer 6 may be formed in a portion other than the portion right above the patterned ink layer 4, and the design pattern of the patterned ink layer 4 may match with the glossiness of the first gloss control layer 5. Thus, the glossiness of the exposed first gloss control layer 5 is imparted to the design pattern of the patterned ink layer 4, so that the visual effects of the gloss control layer 5 can be imparted to the visual effects of the pattered ink layer 4. Thus, a decorative material 1 which expresses a design with an air of luxury close to that of natural wood or natural stone can be formed. The expression "match with" in the present modification refers to at least part of the first gloss control layer 5 being overlapped with the patterned ink layer 4 in plan view. If 50% or more of the area of forming the first gloss control layer 5 overlaps with the patterned ink layer 4, both layers may be visually recognized as highly matching with each other.

(2) In the example provided above, the resin component included in the second gloss control layer 6 is a mixture of a urethane-based thermosetting resin containing a polyol and an isocyanate with an ionizing radiation-curable resin having an acryloyl group or a methacryloyl group. However, other configurations may be used.

For example, the resin component included in the second gloss control layer 6 may be only an ionizing radiation-curable resin having an acryloyl group or a methacryloyl group. Thus, scratch resistance of the second gloss control layer 6 can be improved.

EXAMPLES

Specific examples of the decorative material 1 of the present embodiment will be described below.

Example 1

In Example 1, impregnated paper having a basis weight of 50 g/m$^2$ (GFR-506 manufactured by Kohjin Co., Ltd.) was used as a base material 2. On one surface of the base material 2, a base solid ink layer 3 and a patterned ink layer 4 were formed in this order using oily nitrocellulose resin gravure printing inks (various colors of PCNT (PCRNT) manufactured by Toyo Ink Co., Ltd.). The design pattern of the patterned ink layer 4 was a wood grain pattern.

Subsequently, an ink for a first gloss control layer 5 was applied across one surface of the base material 2 on which the patterned ink layer 4 had been formed to thereby form a first gloss control layer 5. The ink was formulated by adding a two-part urethane-based thermosetting resin (25 parts by mass of total solid content) containing 54.8 parts by mass (20 parts by mass of solid content) of acrylic polyol (6KW-700 (36.5% solids) manufactured by Taisei Fine Chemical Co., Ltd.) and 6.9 parts by mass (5 parts by mass of solid content) of polyisocyanate (UR190B curing agent (72.5% solids) manufactured by Toyo Ink Co., Ltd.); 10 parts by mass (or more) (135 parts total solids) of a silica-based gloss control agent (MIZUKASIL P-803 manufactured by Mizusawa Industrial Chemicals, Ltd.) which had not been surface-treated; 5 parts by mass of ultraviolet radical initiator (IRGACURE 184 manufactured by BASF); and 4.3 parts by mass (0.8 parts active component relative to total solids) of silicone-based release agent having a hydroxyl group (BYK-SILCLEAN 3700 (25% active component) manufactured by BYK), to 100 parts by mass (100 parts by mass of solid content) of an ionizing radiation-curable resin (dipentaerythritol hexaacrylate (100% solids)). The application amount of the ink was 5 g/m$^2$.

Subsequently, an ink for a second gloss control layer 6 was applied to a portion of the first gloss control layer 5, the portion being right above the patterned ink layer 4, without applying ionizing radiation to the resin component (ionizing radiation-curable resin) included in the first gloss control layer 5, thereby forming a second gloss-adjusting layer 6. The ink was formulated by adding 5 parts by mass (or more) (105 parts total solids) of a silica-based gloss control agent (MIZUKASIL P-803 manufactured by Mizusawa Industrial Chemicals, Ltd.) which had not been surface-treated; 5 parts by mass of ultraviolet radical initiator (IRGACURE 184 manufactured by BASF); and 0.8 parts by mass (0.3 parts active component relative to total solids) of silicone-based release agent having an acryloyl group (BYK-UV3505 (40% active component) manufactured by BYK), to 100 parts by mass (100 parts by mass of solid content) of an ionizing radiation-curable resin (dipentaerythritol hexaacrylate (100% solids)).

Then, the decorative material 1 obtained in this way was irradiated with ionizing radiation to crosslink and cure the ionizing radiation-curable resin in the first and second gloss control layers 5 and 6, followed by heat curing. Thus, a decorative material of Example 1 was obtained.

Example 2

In Example 2, the ink for the first gloss control layer 5 was formulated so as to contain 5.4 parts by mass (1.0 parts active component relative to total solids) of silicone-based release agent having a hydroxyl group (BYK-SILCLEAN 3700 (25% active component) manufactured by BYK), and the ink for the second gloss control layer 6 was formulated so as to contain 1.3 parts by mass (0.5 parts active component relative to total solids) of silicone-based release agent having an acryloyl group (BYK-UV3505 (40% active component) manufactured by BYK). The remaining configuration was the same as that of Example 1. Thus, a decorative material of Example 2 was obtained.

Example 3

In Example 3, the ink for the first gloss control layer 5 was formulated so as to contain 10.8 parts by mass (2.0 parts active component relative to total solids) of silicone-based release agent having a hydroxyl group (BYK-SILCLEAN 3700 (25% active component) manufactured by BYK), and the ink for the second gloss control layer 6 was formulated so as to contain 5.3 parts by mass (2.0 parts active component relative to total solids) of silicone-based release agent having an acryloyl group (BYK-UV3505 (40% active component) manufactured by BYK). The remaining configuration was the same as that of Example 1. Thus, a decorative material of Example 3 was obtained.

Example 4

In Example 4, the ink for the second gloss control layer 6 was formulated by adding a two-part urethane-based thermosetting resin (25 parts by mass of total solid content) containing 54.8 parts by mass of acrylic polyol (6KW-700 (36.5% solids) manufactured by Taisei Fine Chemical Co., Ltd.) and 6.9 parts by mass of polyisocyanate (UR190B curing agent (72.5% solids) manufactured by Toyo Ink Co., Ltd.); 5 parts by mass (or more) (130 parts total solids) of a silica-based gloss control agent (MIZUKASIL P-803 manufactured by Mizusawa Industrial Chemicals, Ltd.) which had not been surface-treated; 5 parts by mass of ultraviolet radical initiator (IRGACURE 184 manufactured by BASF); and 6.5 parts by mass (2.0 parts active component relative to total solids) of silicone-based release agent having an acryloyl group (BYK-UV3505 (40% active component) manufactured by BYK), to 100 parts by mass (100 parts by mass of solid content) of an ionizing radiation-curable resin (dipentaerythritol hexaacrylate (100% solids)). The remaining configuration was the same as that of Example 3. Thus, a decorative material of Example 4 was obtained.

Example 5

In Example 5, the ink for the first gloss control layer 5 was formulated so as to contain 27.0 parts by mass (5.0 parts active component relative to total solids) of silicone-based release agent having a hydroxyl group (BYK-SILCLEAN 3700 (25% active component) manufactured by BYK), and the ink for the second gloss control layer 6 was formulated so as to contain 11.8 parts by mass (4.5 parts active component relative to total solids) of silicone-based release agent having an acryloyl group (BYK-UV3505 (40% active component) manufactured by BYK). The remaining configuration was the same as that of Example 1. Thus, a decorative material of Example 5 was obtained.

Example 6

In Example 6, the ink for the first gloss control layer 5 was formulated so as to contain 35.1 parts by mass (6.5 parts active component relative to total solids) of silicone-based release agent having a hydroxyl group (BYK-SILCLEAN 3700 (25% active component) manufactured by BYK), and the ink for the second gloss control layer 6 was formulated so as to contain 14.5 parts by mass (5.5 parts active component relative to total solids) of silicone-based release agent having an acryloyl group (BYK-UV3505 (40% active component) manufactured by BYK). The remaining configuration was the same as that of Example 1. Thus, a decorative material of Example 6 was obtained.

Comparative Example 1

In Comparative Example 1, the ink for the first gloss control layer 5 was formulated so as to contain 2.6 parts by mass (1.0 part active component relative to total solids) of non-reactive silicone-based release agent (BYK-330 (51% active component) manufactured by BYK), and the ink for the second gloss control layer 6 was formulated so as to contain 1.0 part by mass (0.5 parts active component relative to total solids) of non-reactive silicone-based release agent (BYK-330 (51% active component) manufactured by BYK). The remaining configuration was the same as that of Example 1. Thus, a decorative material of Comparative Example 1 was obtained.

Comparative Example 2

In Comparative Example 2, the ink for the first gloss control layer 5 was formulated so as to contain 5.3 parts by mass (2.0 parts active component relative to total solids) of non-reactive silicone-based release agent (BYK-330 (51% active component) manufactured by BYK), and the ink for the second gloss control layer 6 was formulated so as to contain 4.1 part by mass (2.0 parts active component relative to total solids) of non-reactive silicone-based release agent (BYK-330 (51% active component) manufactured by BYK). The remaining configuration was the same as that of Example 1. Thus, a decorative material of Comparative Example 2 was obtained.

Comparative Example 3

In Comparative Example 3, the ink for the first gloss control layer 5 was formulated so as to contain 13.2 parts by mass (5.0 parts active component relative to total solids) of non-reactive silicone-based release agent (BYK-330 (51% active component) manufactured by BYK), and the ink for the second gloss control layer 6 was formulated so as to contain 9.3 part by mass (4.5 parts active component relative to total solids) of non-reactive silicone-based release agent (BYK-330 (51% active component) manufactured by BYK).

The remaining configuration was the same as that of Example 1. Thus, a decorative material of Comparative Example 3 was obtained.

Comparative Example 4

In Comparative Example 4, the ink for the first gloss control layer 5 was formulated so as to contain 10 parts by mass of a silica-based gloss control agent (MIZUKASIL P-802Y manufactured by Mizusawa Industrial Chemicals, Ltd.) which had been surface-treated. The remaining configuration was the same as that of Example 2. Thus, a decorative material of Comparative Example 4 was obtained.

Comparative Example 5

In Comparative Example 5, the ink for the first gloss control layer 5 was formulated so as to contain 10 parts by mass of a silica-based gloss control agent (MIZUKASIL P-802Y manufactured by Mizusawa Industrial Chemicals, Ltd.) which had been surface-treated. The remaining configuration was the same as that of Example 5. Thus, a decorative material of Comparative Example 5 was obtained.

(Evaluations)

Examples 1 to 6 and Comparative Examples 1 to 5 set forth above were evaluated in terms of release properties and scratch resistance.

<Release Properties (Repetition)>

Sellotape (trademark, 24 mm, manufactured by Nichiban Co., Ltd.) was attached to each specimen and sufficiently uniformly pressed against the specimen. After that, the tape was rapidly torn off from the specimen at an angle of 90°. This was repeated five times targeting the same spot of each specimen. After the repetition, if no interleaf separation, interlayer separation or the like was observed, the specimen was evaluated as "○", if separation was observed even in part, the specimen was evaluated as "Δ", and if full separation was observed, the specimen was evaluated as "x". If the specimen was evaluated as "○" or "Δ", the specimen was taken to be acceptable because there was no problem in use.

<Release Properties (Long Period)>

Sellotape (trademark, 24 mm, manufactured by Nichiban Co., Ltd.) was attached to each specimen and sufficiently uniformly pressed against the specimen. After that, such specimens were left under an environment of 60° C. for 4 days. Then, the specimens were taken out and cooled down to room temperature. Then, the tape of each specimen was rapidly torn off at an angle of 90°. If no interleaf separation, interlayer separation or the like was observed, the specimen was evaluated as "○", if separation was observed even in part, the specimen was evaluated as "Δ", and if full separation was observed, the specimen was evaluated as "x". If the specimen was evaluated as "○" or "Δ", the specimen was taken to be acceptable because there was no problem in use.

(Scratch Resistance)

The obtained decorative materials were each subjected to a 10-reciprocation scratch resistance test using steel wool (#0000) with a load of 500 g/cm$^2$. Then, each specimen was visually examined in terms of the presence of scratches or change in glossiness.

If no change was observed in glossiness, the specimen was evaluated as "⊚", if change in glossiness was slightly observed, the specimen was evaluated as "○", if change in glossiness was apparent although there were no scratches, the specimen was evaluated as "Δ", and if scratches or large changes in glossiness were observed, the specimen was evaluated as "x". If the specimen was evaluated as "○" or "Δ", the specimen was taken to be acceptable because there was no problem in use.

These evaluations are shown in Table 1.

TABLE 1

| | First gloss control layer | | | | | Second gloss control layer | |
|---|---|---|---|---|---|---|---|
| Items | Ionizing radiation-curable resin | Urethane-based thermosetting resin | Gloss control agent surface | Release agent Reactivity | Additive amount | Ionizing radiation-curable resin | Urethane-based thermosetting resin |
| Example 1 | 100 parts by mass | 25 parts by mass | Hydrophilicity | Reactive (Hydroxyl group) | 0.8 parts | 100 parts by mass | 0 parts by mass |
| Example 2 | 100 parts by mass | 25 parts by mass | Hydrophilicity | Reactive (Hydroxyl group) | 1.0 parts | 100 parts by mass | 0 parts by mass |
| Example 3 | 100 parts by mass | 25 parts by mass | Hydrophilicity | Reactive (Hydroxyl group) | 2.0 parts | 100 parts by mass | 0 parts by mass |
| Example 4 | 100 parts by mass | 25 parts by mass | Hydrophilicity | Reactive (Hydroxyl group) | 2.0 parts | 100 parts by mass | 25 parts by mass |
| Example 5 | 100 parts by mass | 25 parts by mass | Hydrophilicity | Reactive (Hydroxyl group) | 5.0 parts | 100 parts by mass | 0 parts by mass |
| Example 6 | 100 parts by mass | 25 parts by mass | Hydrophilicity | Reactive (Hydroxyl group) | 6.5 parts | 100 parts by mass | 0 parts by mass |
| Comparative Example 1 | 100 parts by mass | 25 parts by mass | Hydrophilicity | Non-reactive | 1.0 parts | 100 parts by mass | 0 parts by mass |
| Comparative Example 2 | 100 parts by mass | 25 parts by mass | Hydrophilicity | Non-reactive | 2.0 parts | 100 parts by mass | 0 parts by mass |
| Comparative Example 3 | 100 parts by mass | 25 parts by mass | Hydrophilicity | Non-reactive | 5.0 parts | 100 parts by mass | 0 parts by mass |
| Comparative | 100 parts by | 25 parts by | Hydrophobicity | Reactive | 1.0 parts | 100 parts by | 0 parts by |

TABLE 1-continued

| | | | | | | | |
|---|---|---|---|---|---|---|---|
| Example 4 | mass | mass | Hydrophobicity | (Hydroxyl group) Reactive (Hydroxyl group) | 5.0 parts | mass | mass |
| Comparative Example 5 | 100 parts by mass | 25 parts by mass | | | | 100 parts by mass | 0 parts by mass |

| | | Second gloss control layer Release agent | | Release properties | | |
|---|---|---|---|---|---|---|
| | Items | Reactivity | Additive amount | Repetition | Long term | Scratch resistance |
| | Example 1 | Reactive (Acryloyl group) | 0.3 parts | Δ | Δ | ◉ |
| | Example 2 | Reactive (Acryloyl group) | 0.5 parts | ○ | ○ | ◉ |
| | Example 3 | Reactive (Acryloyl group) | 2.0 parts | ○ | ○ | ◉ |
| | Example 4 | Reactive (Acryloyl group) | 2.0 parts | ○ | ○ | ○ |
| | Example 5 | Reactive (Acryloyl group) | 4.5 parts | ○ | ○ | ○ |
| | Example 6 | Reactive (Acryloyl group) | 5.5 parts | Δ | ○ | Δ |
| | Comparative Example 1 | Non-reactive | 0.5 parts | ○ | X | Δ |
| | Comparative Example 2 | Non-reactive | 2.0 parts | ○ | X | ○ |
| | Comparative Example 3 | Non-reactive | 4.5 parts | ○ | X | ○ |
| | Comparative Example 4 | Reactive (Acryloyl group) | 0.5 parts | X | Δ | ◉ |
| | Comparative Example 5 | Reactive (Acryloyl group) | 4.5 parts | X | Δ | ○ |

As will be understood from Table 1, release properties and scratch resistance are both satisfied in the decorative materials 1 of all Examples 1 to 6. However, in Comparative Examples 1 to 3 where a non-reactive release agent was used as a release agent to be contained in the first gloss control layer 5, evaluation was poor only in terms of long-term release properties. This is considered to be because there is no reactivity at all between the release agent and the resin and thus the release agent has bled out of the gloss control layer during the time it was kept at 60° C. without being fixed inside the layer and has caused deterioration in release properties. In Comparative Examples 4 and 5, use of a surface-treated gloss control agent, i.e., a gloss control agent comprised of a hydrophobic inorganic material, enhanced hydrophilicity between the gloss control agent and the release agent. Thus, it is considered that the release agent present on the surface was relatively decreased and release properties were deteriorated accordingly.

As can be seen from the above evaluations, it is apparent that the decorative materials of Examples 1 to 6 are decorative materials 1 satisfying both release properties and scratch resistance.

The decorative material 1 of the present invention is not limited to the above embodiments and examples, but various modifications may be made within the range not impairing the features of the invention.

Hereinafter, decorative materials other than the decorative material of the present embodiment will be briefly described as reference examples.

Decorative materials which are used, for example, for interiors/exteriors of buildings, or surface decoration of joinery, furniture or the like are usually designed by applying a desired design pattern of wood grain, stone or the like. There are also widely used decorative materials which are mainly used for applications where an air of luxury is desired. Such decorative materials not only two-dimensionally express a design pattern of wood grain, stone or the like, but also three-dimensionally express the unevenness of the surfaces of natural wood materials or stone materials.

As methods of imparting an expression of a three-dimensionally textured appearance to the surface of a decorative material together with the two-dimensional design pattern, various methods have been proposed and used according to purpose. Among them, there is a method of visually expressing a three-dimensionally textured appearance by taking advantage of an optical illusion. In this method, the degree of gloss (specifically, glossiness) of the surfaces of the portions desired to be expressed as concavities is made different from that of the surfaces of the portions desired to be expressed as convexities, rather than actually forming unevenness on the surface of the decorative material. According to this method, in spite of there being no uneven configuration present in reality, portions with relatively higher glossiness appear to be convexities and those with relatively lower glossiness appear to be concavities to the human eye.

Specifically, for example, a transparent or translucent synthetic coating layer with low glossiness is formed across the surface of a base material on which patterns, including a concave pattern, are suitably printed. Then, a transparent or translucent synthetic coating layer with high glossiness is formed on portions of the surface of the synthetic coating layer as formed, excepting portions corresponding to the concave pattern. As a matter of course, by reversing the height relationship of glossiness, a decorative material in which the unevenness relationship is reversed can be obtained.

This method can easily impart a three-dimensionally textured appearance to any base materials by only preparing two coating materials that are different in glossiness, without requiring special chemicals or the like. In addition, this method enables formation of the synthetic coating layers with different glossiness by a known printing method, such as gravure printing, following formation of a design pattern (patterned ink layer). Thus, this method requires no special facilities, enhances productivity, and easily achieves matching with the design pattern. Moreover, since the thickness of each synthetic coating layer can be made much smaller than the required apparent height difference of unevenness, use of resins can be reduced and there is an advantage of obtaining flexibility. Thus, a decorative material having high suitability for bending can be easily realized. There is another advantage of preventing contaminants from remaining in the concavities because there is no large unevenness on the surface of the decorative material.

In light of these various advantages, decorative materials using this method have already been mass-marketed and used, but have not yet surpassed the method of actually forming unevenness from the viewpoint of imparting an air of luxury. The reason for this is considered to be as follows. A mechanical embossing method can faithfully reproduce an uneven configuration such as of natural wood vessels, including the cross-sectional configuration of the vessels. In contrast, this method of using two coating materials with different glossiness provides two stages of glossiness to the surface. Accordingly, two stages of unevenness can be expressed. Thus, it is difficult to express an uneven configuration having asperities where the depth (height) continuously varies as in natural wood vessels or the like.

In this regard, recently, there is proposed a decorative material which can express an uneven configuration as in natural wood vessels or the like by providing a gloss control layer (e.g., see PTL 1).

As a general method of controlling glossiness of a gloss control layer, a gloss control agent (matting agent) is added to a transparent resin that serves as a binder. As the gloss control agent, fine particles of an inorganic or organic material are mainly used. In particular, fine particles of an inorganic material, such as fine particles of silica, have high matting performance are widely used. Addition of such a gloss control agent can impart unevenness to the surface of the gloss control layer and this unevenness scatters light to thereby present matting effects. By selecting a gloss control agent and controlling the additive amount thereof, required glossiness can be created as desired.

As the transparent resin serving as a binder, a urethane-based resin containing at least one polyol and at least one isocyanate is often used from the perspective of processability, price, cohesive force of the resin, or the like. Urethane-based resins are characterized in that their characteristics can be variously controlled by combining polyols and isocyanates. However, since polyols and isocyanates each have a relatively large molecular weight and have a small number of functional groups per molecule, it is generally difficult to increase crosslinking density. Crosslinking density is a parameter having a particularly great influence on scratch resistance. Therefore, it is theoretically difficult for urethane-based resins to satisfy high scratch resistance, e.g., scratch resistance required of horizontal surfaces such as of top boards or shelf boards of furniture.

In the case of a gloss control layer using the above matting agent, convexities on the surface may be selectively scraped or the gloss control agent may be desorbed during a scratch resistance test. Therefore, scratch resistance may be evaluated to be poorer. Since the tendency of deterioration of scratch resistance is substantially proportional to the additive amount of the gloss control agent, it may be very difficult for a decorative material having lower glossiness and higher level design to satisfy the scratch resistance required of the horizontal surfaces mentioned above.

In contrast, an ionizing radiation-curable resin having an acryloyl group or a methacryloyl group, which serves as a transparent resin, has a relatively low molecular weight and has a large number of functional groups per molecule. Therefore, this resin has high crosslinking density and is likely to improve scratch resistance. When such an ionizing radiation-curable resin is used as a transparent resin, a decorative material having improved or even high scratch resistance can be provided. The scratch resistance of a decorative material mainly depends on the strength of the uppermost surface. Therefore, the uppermost surface layer alone may use the ionizing radiation-curable resin.

However, when two gloss control layers are used and the uppermost gloss control layer covers only part of the decorative material instead of entirely covering the surface, the gloss control layer located right beneath and covering the entire surface of the decorative material may also have a surface, part of which is exposed. Therefore, in order for a decorative material to have higher scratch resistance, the transparent resins of both the gloss control layers may preferably be ionizing radiation-curable resins. Also, in this case, the upper gloss control layer is laminated so as to cover part of the lower gloss control layer which covers the entire surface of the decorative material. However, ionizing radiation-curable resins are not cured unless they are irradiated with ionizing radiation. Accordingly, in the process of producing a decorative material using a printer in general, the upper gloss control layer for partial coverage is unavoidably laminated on the uncured lower gloss control layer covering the entire surface of the decorative material. This may cause defects such as of dissolving or scraping the gloss control layer covering the entire surface.

Decorative materials are required to have characteristics which correspond to durability from an overall perspective, including scratch resistance mentioned above, in everyday use. In the case of ready-to-assemble furniture, seals indicating the order of assembly may be attached to the furniture when packed. These seals may be detached during or after assembly. It important in this case that the decorative materials of the furniture are imparted with release properties so as not to cause separation.

To impart release properties to a decorative material, it is effective to use a method of adding a release agent to a gloss control layer forming a surface of the decorative material. However, release agents in general, which use a silicone material of a controlled molecular weight, are not fixed inside a gloss control layer. Therefore, such a release agent may bleed out of the layer and be desorbed from the surface of the decorative material on a long-term basis, raising an issue of deterioration in release properties due to aging.

[Reference Signs List] 1 Decorative material; 2 Base material; 3 Base solid ink layer; 4 Patterned ink layer'; 5 First gloss control layer; 6 Second gloss control layer;

What is claimed is:

1. A decorative material, comprising:
   a first gloss control layer provided to a front surface and a second gloss control layer provided on part of the first gloss control layer; and,
   the first gloss control layer containing a gloss control agent comprised of a hydrophilic inorganic material and a silicone-based release agent having a reactive terminal group.

2. The decorative material of claim 1, wherein the reactive terminal group of the silicone-based release agent has at least one of a hydroxyl group and an amino group.

3. The decorative material of claim 1, wherein an additive amount of the silicone-based release agent to the first gloss control layer is formulated such that an active component of the silicone-based release agent is in a range of 1 part by mass or more and 6 parts by mass or less relative to 100 parts by mass of solid content included in the first gloss control layer.

4. The decorative material of claim 1, wherein:
   a resin component included in the first gloss control layer contains a main material that is a mixture of a urethane-based thermosetting resin containing a polyol and an isocyanate with an ionizing radiation-curable resin having an acryloyl group or a methacryloyl group; and,
   a content of the urethane-based thermosetting resin is in a range of 3 parts by mass or more and 100 parts by mass or less relative to 100 parts by mass of the ionizing radiation-curable resin.

5. The decorative material of claim 1, wherein:
   the second gloss control layer contains a silicone-based release agent having a reactive terminal group; and,
   the reactive terminal group of the silicone-based release agent has at least one of an acryloyl group and a methacryloyl group.

6. The decorative material of claim 5, wherein an additive amount of the silicone-based release agent to the second gloss control layer is formulated such that an active component of the silicone-based release agent is in a range of 0.5 parts by mass or more and 5 parts by mass or less relative to 100 parts by mass of solid content included in the second gloss control layer.

7. The decorative material of claim 1, wherein:
   a resin component included in the second gloss control layer contains a main material that is a mixture of a urethane-based thermosetting resin containing a polyol and an isocyanate with an ionizing radiation-curable resin having an acryloyl group or a methacryloyl group; and,
   a content of the urethane-based thermosetting resin is 25 parts by mass or less relative to 100 parts by mass of the ionizing radiation-curable resin.

8. The decorative material of claim 1, wherein a resin component included in the second gloss control layer has a main material that is an ionizing radiation-curable resin having an acryloyl group or a methacryloyl group.

9. The decorative material of claim 4, wherein the ionizing radiation-curable resin having an acryloyl group or a methacryloyl group has a number average molecular weight in a range of 300 or more and 5,000 or less.

10. The decorative material of claim 9, wherein the ionizing radiation-curable resin having an acryloyl group or a methacryloyl group has a number average molecular weight in a range of 300 or more and 1,500 or less.

11. The decorative material of claim 1, wherein:
    the decorative material includes a patterned ink layer under the first gloss control layer; and,
    the second gloss control layer is formed in a portion overlapping a design pattern of the patterned ink layer as viewed perpendicularly to a front surface, and the design pattern of the patterned ink layer matches with glossiness of the second gloss control layer.

12. The decorative material of claim 1, wherein:
    the decorative material includes a patterned ink layer under the first gloss control layer; and,
    the second gloss control layer is formed in a portion other than a portion right above a design pattern of the patterned ink layer, and the design pattern of the patterned ink layer matches with glossiness of the first gloss control layer.

\* \* \* \* \*